Figure 1:
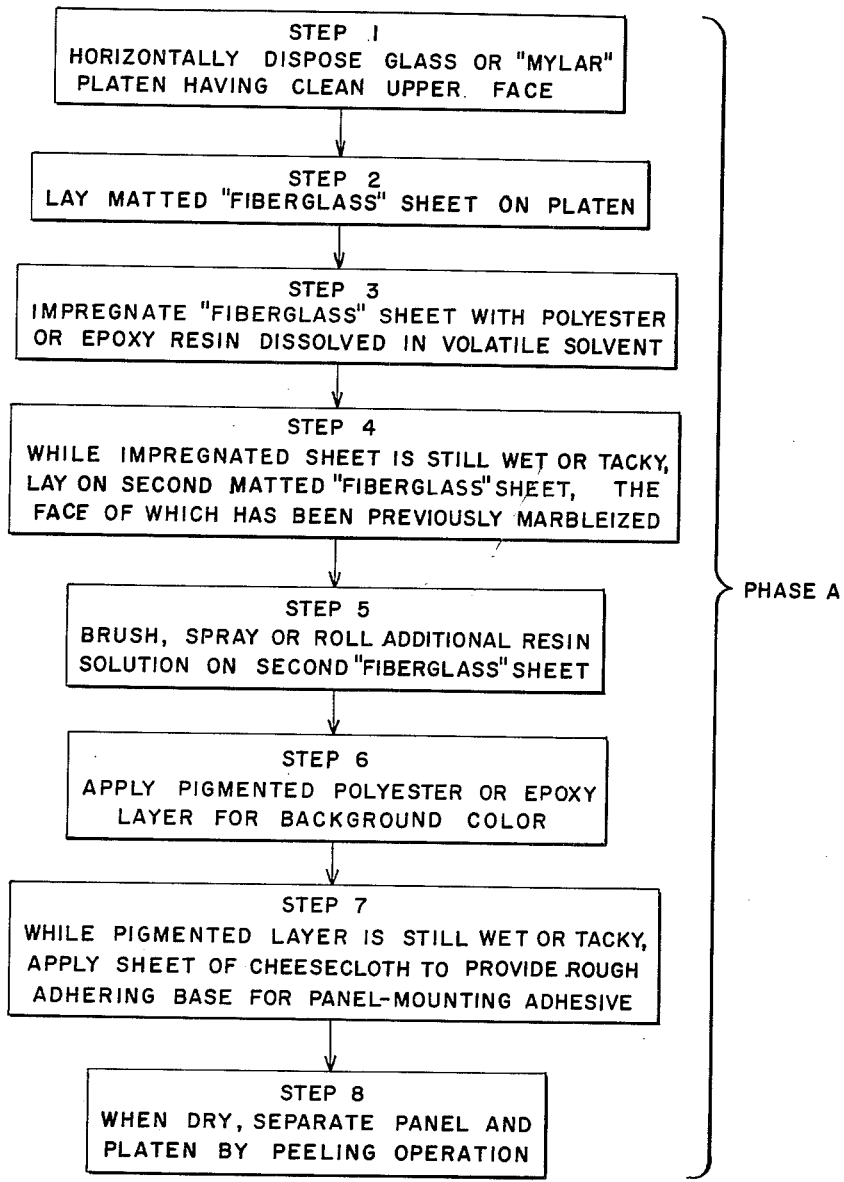

FIG. 2
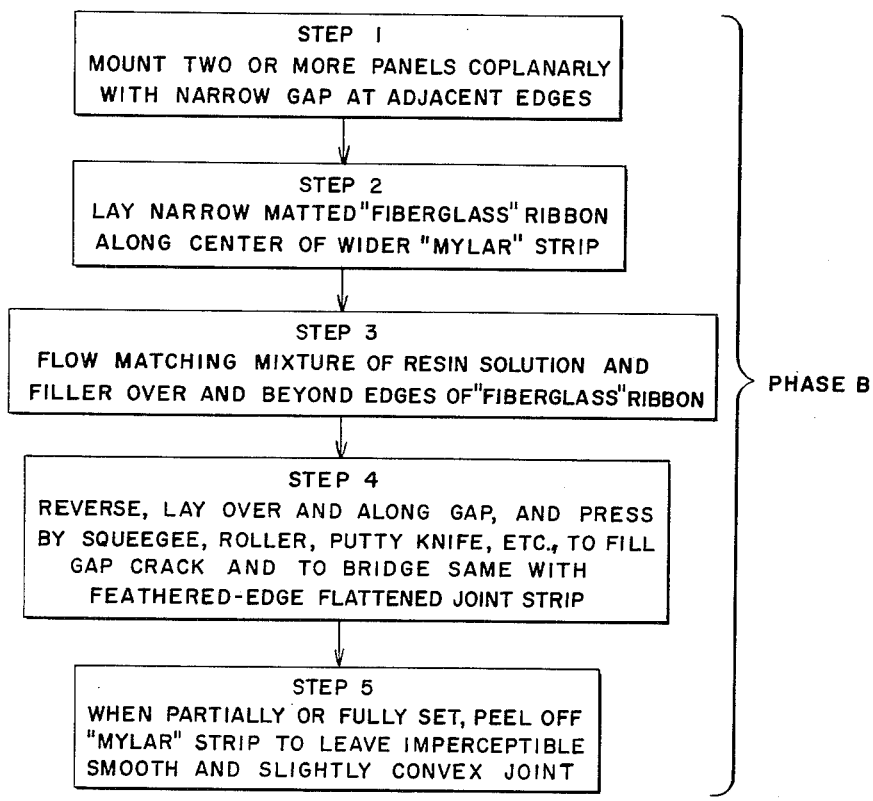
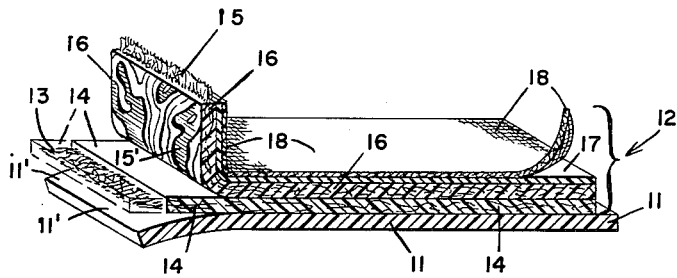
FIG. 3

INVENTOR
EUGENE CALIGARI, JR.

BY *Felix A. Russell*

ATTORNEY

United States Patent Office 3,198,686
Patented Aug. 3, 1965

3,198,686
POLISHED SURFACE LAMINATED PLASTIC PANEL AND METHOD OF MAKING THE SAME
Eugene Caligari, Jr., 806 W. 21st St., Norfolk, Va.
Filed July 5, 1961, Ser. No. 121,980
11 Claims. (Cl. 161—6)

This invention relates to a polished surface laminated plastic panel and method of making the same.

Generally the laminated panel is built up by laying a matted glass fiber sheet on the smooth flat surface of a platen sheet of glass or sheet of plastic material, such as "Mylar" (a polyester resin, specifically a polyethylene terephthalate resin), and saturating said glass fiber sheet with a polyester or an epoxy resin dissolved in a highly volatile solvent. Preferably while the first resin saturated sheet is still wet or tacky, a second matted glass fiber sheet, which desirably was previously provided with a marbleized or other decorative surface, is then laid face down on the first sheet. The second sheet is next impregnated with the same or a similar resin solution. There is then applied another layer of resin solution, which is desirably pigmented to give a background color to the panel. A backing lamina of cheesecloth is laid on the wet or tacky second sheet. After the laminated structure has set, the "Mylar" platen sheet is peeled away therefrom, or if the laminated structure is the more flexible, it will be peeled away by a slight flexing thereof, from the "Mylar" or glass platen.

Two or more panels can be edge-joined to form a larger panel or wall by laying a narrow strip of matted glass fiber medially on a considerably wider strip of "Mylar," saturating the glass fiber strip with resin solution matching the panel material, laying the saturated strip over and along the gap between adjacent panel edges, flattening the joint assemblage by rolling or otherwise, and peeling off the "Mylar" strip when the joint has set.

It is accordingly an object of this invention to provide a method of making a glass fiber laminated plastic panel having an inherently polished face by constructing the panel face-down against a smooth glass or plastic platen to which the panel plastic will adhere while wet but will not adhere when dry.

It is another object of the invention to provide a method of edge-joining a plurality of laminated plastic panels with an inherently smooth and imperceptibly convex joint.

It is a further object of the invention to provide a method of edge-joining smooth plastic panels by laying plastic joint material medially on a flexible strip of "Mylar" or the like, laying the joint assemblage over and along the contiguous panel edges, pressing the assemblage nearly flat, and peeling off the "Mylar" strip when the joint has set.

It is another object of the invention to provide a glass fiber laminated panel having a marbleized or similar finish on the face of one glass fiber lamina and/or a pigmented background plastic layer.

It is a further object of the invention to provide a laminated plastic panel having a cheesecloth or similar backing lamina to provide a rough surface for better adhesive bonding to mounting surfaces.

It is yet another object of the invention to provide a plural panel assemblage having an imperceptibly convex panel-matching joint bridging the gap between contiguous panels.

Figure 4:
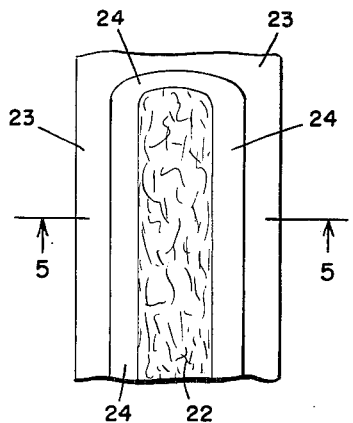
Figure 5:
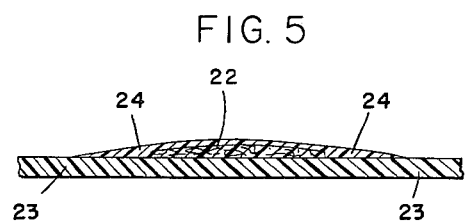
Figure 6:
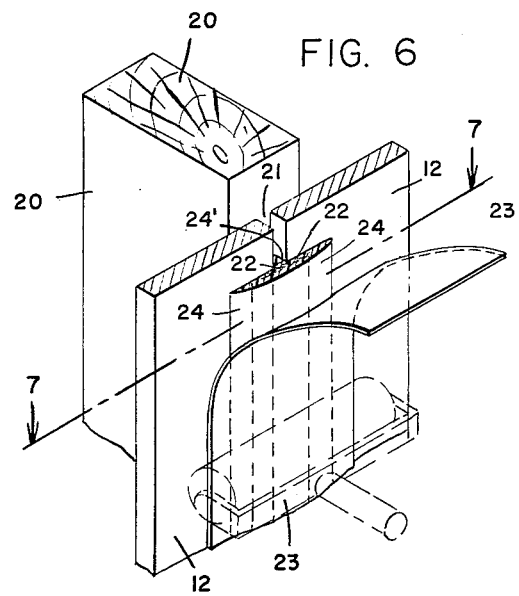
Figure 7:
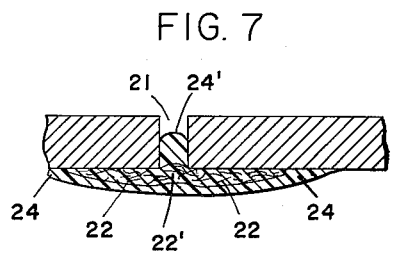

Other and further objects of the invention will become apparent from a reading of the following specification taken in conjunction with the drawings, in which:

FIGURE 1 is a flow chart outlining the method of constructing each panel,

FIGURE 2 is a flow chart outlining the method of forming the panel uniting joint, FIGURE 3 is a perspective view of a section of a panel with portions separated for illustrative purposes, FIGURE 4 is a plan view of a joint-making assemblage, FIGURE 5 is an enlarged elevational view of the showing of FIGURE 4, in section, taken on line 5—5 of FIGURE 4, FIGURE 6 is a perspective view illustrating the method of joining contiguous panels, and FIGURE 7 is an enlarged plan view of the joint of FIGURE 6, in section, taken on line 7—7 of FIGURE 6.

With reference now to FIGURES 1 and 3, the numeral 11 designates a smooth surface platen upon which a glass fiber laminated plastic panel generally designated 12 is built up. The platen 11 is desirably a flexible sheet of "Mylar" (a polyester resin) having a very smooth upper surface which is carefully cleaned before each panel is built up thereon. "Mylar" has the desirable property of being adhesive to volatile-solvent solutions of the polyester or epoxy resins utilized in the method herein disclosed, when said solutions are liquid or tacky, but non-adhesive thereto when the resins set upon evaporation of their solvents. Glass or other materials having like properties, can be substituted for "Mylar" in forming the platen 11.

The method of fabricating the panel 11 is outlined in the flow chart of FIGURE 1. The first step is the horizontal positioning of the "Mylar" or glass platen 11 with its clean, smooth surface uppermost. Step 2 is the laying of a matted glass fiber sheet 13 (FIG. 3) on the platen 11. Next (step 3) the sheet 13 is impregnated with a polyester or epoxy resin dissolved in any suitable volatile solvent, applied to the sheet 13 by spraying, rolling or flowing, etc., to build up a fiber reinforced plastic lamina 14.

While the plastic lamina 14 is still wet or tacky, a second sheet 15 of matted glass fiber is laid thereon (step 4). The sheet 15 desirably has its downwardly faced surface marbleized, as shown at 15', or otherwise decoratively imprinted prior to assemblage. The decorative pattern 15' on the sheet 15 will show through the clear plastic lamina 14 and the matted glass fiber sheet 13 embedded therein. However, the decoratively printed sheet 15' may be the first laid one, if preferred.

Step 5 consists of spraying, brushing, rolling or otherwise applying more resin solution to impregnate the second glass fiber sheet 15 and to build up a second fiber reinforced lamina 16.

Step 6 consists of applying a coat 17 of the resin solution containing a quantity of pigment for the purpose of adding a background color to the laminated panel 12. While the pigmented coating or layer 17 is still wet or tacky, a final sheet 18 of cheesecloth is laid therein (step 7), to provide a rough base surface for better bonding thereto of adhesive material employed in mounting the finished laminated panels 12 on a wall or similar surface.

Finally (step 8) after the laminated panel 12 has set, the same is separated from its platen 11 by a peeling operation. In FIGURE 3, the flexible "Mylar" platen 11 is shown being peeled downwardly at 11' away from the somewhat thicker and less flexible panel 12. However, if the platen 11 is formed of glass or other relatively stiff material and especially if the laminated panel 12 is relatively thin and flexible, the panel will be peeled, by slight flexing, away from the stiff platen.

FIGURES 2 and 4 to 7, inclusive, describe and illustrate a method (phase B) of edge-joining a plurality of panels 12 (made by the method of phase A) in fabricating a wall or like structure. In FIGURE 6, the two panels 12 are shown fixed (step 1 of phase B) to a conventional wall stud 20, by any conventional means such as adhesive material (not shown), and leaving a joint gap 21 therebetween.

The joint is formed by next (step 2) laying a relatively narrow matted glass fiber ribbon 22 (FIG. 4) along the center of a wider flexible "Mylar" strip 23. A fluid mixture of resin solution and filler is then flowed over and along the glass fiber ribbon 22 and somewhat beyond the edges thereof (step 3 of phase B) to impregnate and cover the ribbon 22 and to form a liquid plastic film 24 terminating intermediate the edges of the ribbon 22 and the "Mylar" strip 23.

The fourth step of phase B is placing the assembled ribbon 22, "Mylar" strip 23 and plastic coating 24 over and along the joint gap 21 (FIGURES 6 and 7) and rolling by a roller 25 to flatten the assemblage and to force some of the material of film 24 through the porous ribbon 22 and into the gap 21 to form a joint-caulking tongue 24'. The rolling, or other pressing and flattening, operation produces a substantially imperceptible slightly convex and feathered-edge joint (FIGURES 6 and 7) which set is completed by peeling off the "Mylar" strip 23 (step 5) to leave a smooth surface matching the adjacent surfaces of the panels 12.

While several modifications of the invention have been made herein, it will be readily apparent to those skilled in the art that many minor changes may be made without departing from the spirit of the invention or the scope of the appended claims.

What is claimed is:

1. A method of making a fiber reinforced laminated plastic panel, comprising: laying a glass fiber sheet on a smooth platen, impregnating said glass fiber sheet with a polyester resin dissolved in a volatile solvent, laying a second glass fiber sheet over said first glass fiber sheet before the impregnating dissolved resin has set, impregnating said second glass fiber sheet with said resin, before the exposed surface of the assembled impregnated glass fiber sheets has dried, applying a meshed fabric thereto to provide a rough surface for bonding said plastic panel to a supporting surface, allowing the resin to set, and separating said laminated panel from said platen.

2. A method according to claim 1, said platen being a sheet of smooth surfaced polyethylene terephthalate resin and in which is included the step of peeling the sheet from the panel to remove it from said platen leaving an inherently polished surface.

3. A method of joining a pair of coplanarly disposed panels having a narrow gap between their contiguous edges, comprising: laying a narrow ribbon of porous glass fiber material along the center of a relatively wide flexible plastic strip, flowing a polyester resin dissolved in a volatile solvent over and somewhat beyond the edges of said glass fiber ribbon, pressing said plastic strip over and along said gap so as to force some of said resin through said glass fiber ribbon and into said gap and to provide a thin convex and feathered-edge plastic film over and beyond the edges of said ribbon, and, after said resin has set, peeling off said flexible plastic strip to leave a smooth polished joint area therebeneath.

4. A method according to claim 3, said strip being flexible sheet polyethylene terephthalate resin.

5. A method of making a fiber reinforced laminated plastic panel, comprising: laying a glass fiber sheet on a smooth platen, impregnating said glass fiber sheet with an epoxy resin dissolved in a volatile solvent, laying a second glass fiber sheet over said first glass fiber sheet before the impregnating dissolved resin has set, impregnating said second glass fiber sheet with said resin, before the exposed surface of the assembled impregnated glass fiber sheets has dried, applying a meshed fabric thereto to provide a rough surface for bonding said plastic panel to a supporting surface, allowing the resin to set, and separating said laminated panel from said platen.

6. A method according to claim 5, said platen being a sheet of smooth surfaced polyethylene terephthalate resin and in which is included the step of peeling the sheet from the panel to remove it from said platen leaving an inherently polished surface.

7. A method of joining a pair of coplanarly disposed panels having a narrow gap between their contiguous edges, comprising: laying a narrow ribbon of porous glass fiber material along the center of a relatively wide flexible plastic strip, flowing an epoxy resin dissolved in a volatile solvent over and somewhat beyond the edges of said glass fiber ribbon, pressing said plastic strip over and along said gap so as to force some of said resin through said glass fiber ribbon and into said gap and to provide a thin convex and feathered-edge plastic film over and beyond the edges of said ribbon, and, after said resin has set, peeling off said flexible plastic strip to leave a smooth polished joint area therebeneath.

8. A laminated fiber reinforced plastic panel, comprising: a plurality of superposed integrally joined laminae, each including a porous glass fiber sheet impregnated with polyester resin, one of said glass fiber sheets having a decorative pattern impressed on a surface thereof, and a meshed fabric sheet adhered to the back surface of said panel.

9. Structure according to claim 8, additionally comprising a pigmented polyester resin layer interposed between certain of said sheets to provide background coloration for said panel.

10. Structure according to claim 8, additionally comprising a pigmented epoxy resin layer interposed between certain of said sheets to provide background coloration for said panel.

11. A laminated fiber reinforced plastic panel, comprising: a plurality of superposed integrally joined laminae, each including a porous glass fiber sheet impregnated with epoxy resin, one of said glass fiber sheets having a decorative pattern impressed on a surface thereof, and a meshed fabric sheet adhered to the back surface of said panel.

References Cited by the Examiner

UNITED STATES PATENTS

| | | | |
|---|---|---|---|
| 756,926 | 4/04 | Zaisser | 156—71 |
| 2,070,596 | 2/37 | Hansen | 156—247 |
| 2,313,990 | 3/43 | Crandell | 154—43 |
| 2,314,523 | 3/43 | Speer | 154—43 |
| 2,743,207 | 4/56 | Rusch. | |
| 2,744,044 | 5/56 | Toulmin. | |
| 2,801,949 | 8/57 | Bateman. | |
| 2,830,925 | 4/58 | Fennebresque et al. | |
| 2,891,885 | 6/59 | Brooks | 156—314 |
| 2,905,580 | 9/59 | Krier. | |

EARL M. BERGERT, *Primary Examiner.*